United States Patent [19]

Minami

[11] 4,211,940
[45] Jul. 8, 1980

[54] ELECTRONIC POWER CONTROL DEVICE

[75] Inventor: Shunji Minami, Katano, Japan

[73] Assignee: Matsushita Electric Industrial Co., Ltd., Osaka, Japan

[21] Appl. No.: 898,186

[22] Filed: Apr. 20, 1978

[30] Foreign Application Priority Data

Apr. 27, 1977 [JP] Japan ................................ 52-49569

[51] Int. Cl.$^2$ ........................ H03K 17/60; H03K 1/00
[52] U.S. Cl. ............................... 307/251; 307/247 A; 307/296 R
[58] Field of Search ................ 315/DIG. 4; 307/251, 307/247 R, 304, 296

[56] References Cited

U.S. PATENT DOCUMENTS

| 3,988,596 | 10/1976 | Minami et al. ...................... 307/251 |
| 4,032,838 | 6/1977 | Minami et al. ...................... 307/251 |

Primary Examiner—Stanley D. Miller, Jr.
Assistant Examiner—B. P. Davis
Attorney, Agent, or Firm—Burgess, Ryan and Wayne

[57] ABSTRACT

An electronic power control device including two R-S flip-flops, two diodes, an analog memory consisting of a MOS field-effect transistor, a nonpolarized capacitor and an analog switch, and a firing circuit interconnected between the ground and a trapezoidal waveform power level source, whereby a power delivered to a load may be stepped up or down instantaneously or may be maintained constant. When the load is an incandescent lamp, the latter may be instantaneously turned on or off by a simple "push-on" of a switch.

4 Claims, 4 Drawing Figures

ELECTRONIC POWER CONTROL DEVICE

BACKGROUND OF THE INVENTION

The present invention relates to an electronic power control device.

In general the conventional power control devices used for incandescent- and fluorescent-lamp brightness controls consist of switches and slide rheostats. The rheostats consume a considerable amount of energy. In addition, only manual control is possible.

Various types of analog memories have been devised and demonstrated. One type consists of a motor and a potentiometer. Another type incorporates a capacitor. Still another type consists of a combination of an A/D converter, a digital memory and a D/A converter. A further type consists of a magnet. A still further type is based on electrochemical reactions. The analog memory consisting of the combination of a motor and a potentiometer may be used for stepping a DC voltage up or down to a suitable level or for maintaining it at a suitable level but it has a defect that because of mechanical tolerances an output signal is deviated from an input signal. The analog memory consisting of an A/D converter, a digital memory and a D/A converter is disadvantageous in that it is complex in construction and large in size and requires a large number of parts.

SUMMARY OF THE INVENTION

One of the objects of the present invention is therefore to provide an electronic power control device which may accomplish UP, DOWN and STOP (HOLD) controls of power delivered to load by simple "push-on" operations of switches.

Another object of the present invention is to provide an electronic power control device which may instantaneously turn off or on a controlled circuit in case of an emergency.

To the above and other ends, the present invention provides an electronic power control device comprising a first R-S flip-flop with a set input terminal connected through an UP switch to a DC power source and a reset input terminal connected through a DOWN switch to said DC power source; a second R-S flip-flop with a set input terminal connected through first and second diodes to said set and reset input terminals of said first R-S flip-flop and a reset input terminal connected through a STOP switch to said DC power source; an analog memory comprising an input resistor with one end connected to an output terminal of said first R-S flip-flop, an analog switch one end of which is connected to the other end of said input resistor and which is enabled or disabled in response to the output from said second R-S flip-flop, a second nonpolarized capacitor interconnected between the other end of said analog switch and the ground, and a MOS field-effect transistor with the gate connected to said other end of said analog switch, the drain connected to a power source and the source connected to an output terminal and grounded through an output resistor; a firing circuit connected in series to a control resistor and a second capacitor and interconnected between the ground and a trapezoidal waveform power source in such a way that said firing circuit may be fired or conducted in response to a predetermined level of voltage charged across said second capacitor; and a semiconductor device for controlling a level of voltage charged across said second capacitor in response to the output from said analog memory.

BRIEF DESCRIPTION OF THE DRAWINGS

Same reference numerals are used to designate similar parts throughout the figures.

DETAILED DESCRIPTION OF THE PREFERRED EMBODIMENTS

Figure 1:
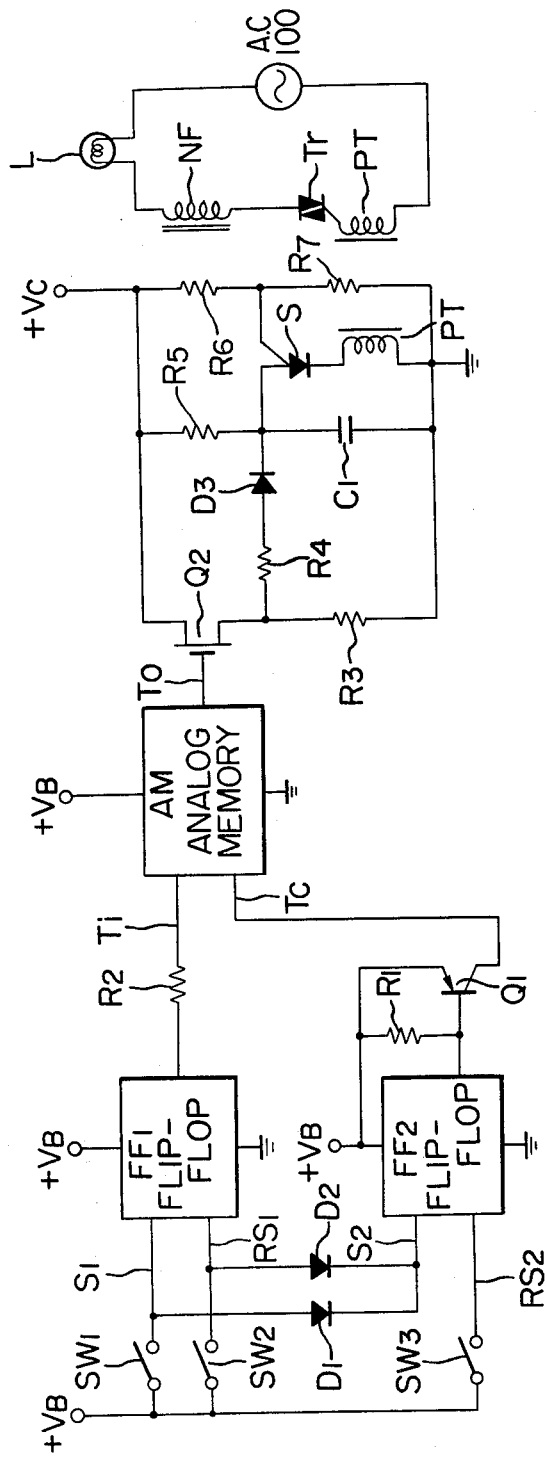
FIG. 1 is an electrical circuit diagram of a first embodiment of an electronic power control device in accordance with the present invention.
Figure 2:
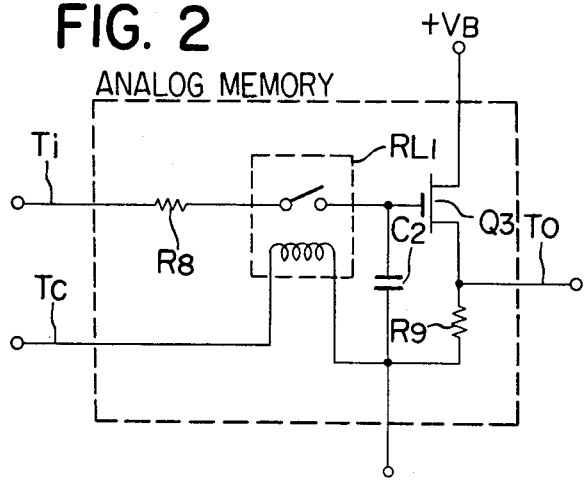
FIG. 2 is an electrical circuit diagram of an analog memory thereof.

First Embodiment, FIGS. 1 and 2

Referring to FIGS. 1 and 2, the first embodiment of the present invention will be described. Referring first to FIG. 1, a first diode $D_1$ is interconnected between a set input terminal $S_1$ of a first R-S flip-flop $FF_1$ and a set input terminal $S_2$ of a second R-S flip-flop $FF_2$, and a second diode $D_2$ is interconnected between a reset input terminal $RS_1$ of the first flip-flop $FF_1$ and the set input terminal $S_2$ of the second flip-flop $FF_2$. The output terminal of the second flip-flop $FF_2$ is connected to the base of a transistor $Q_1$, and a resistor $R_1$ is interconnected between the base and emitter of the transistor $Q_1$. The emitter of this transistor $Q_1$ is connected to a DC power source $+V_B$, and the collector thereof is connected to a control terminal Tc of an analog memory AM. The output terminal of the first flip-flop $FF_1$ is connected through a resistor $R_2$ to an input terminal Ti of the analog memory AM. One ends (anodes) of the first and second diodes $D_1$ and $D_2$ are connected to fixed contacts of switches $SW_1$ and $SW_2$, respectively. A reset input terminal $RS_2$ of the second flip-flop $FF_2$ is also connected to a fixed contact of a switch $SW_3$. Movable contacts of these switches $SW_1$, $SW_2$ and $SW_3$ are connected to a DC power source $+V_B$. The first and second flip-flops $FF_1$ and $FF_2$ and the analog memory AM are also connected to a DC power source $+V_B$.

The output terminal $T_O$ of the analog memory AM is connected to the gate of a first MOS field-effect transistor $Q_2$ having its drain connected to a trapezoidal waveform power source $+V_C$ wherein a zener diode (not shown) shapes a half-wave rectified wave into a trapezoidal wave. The source of the first field-effect transistor $Q_2$ is grounded through a resistor $R_3$ and is connected through a resistor $R_4$ to the anode of a third diode $D_3$ having its cathode grounded through a first nonpolarized capacitor $C_1$ and connected through a resistor $R_5$ to the power source $+V_C$. The cathode of the third diode $D_3$ is further connected to the anode of an N-gate thyristor S having its cathode grounded through a primary winding of a pulse transformer PT. The gate of the thyristor S is connected through a resistor to the power source $+V_C$ and is grounded through a resistor $R_7$. The secondary of the pulse transformer PT is interconnected between the control electrode and the first electrode of a power control bidirectional thyristor Tr. The second electrode of the thyristor Tr is connected through a noise filter NF and an incandescent lamp L to one terminal of a commercial AC source while the first electrode of the thyristor Tr is connected to the other terminal of the AC source.

FIG. 2 shows the analog memory. The input terminal $T_i$ is connected through an input resistor $R_8$ to a movable contact of a first reed relay $RL_1$ with its fixed contact connected to the gate of a second field-effect transistor $Q_3$. This gate is grounded through a second nonpolarized capacitor $C_2$ and the source is grounded through a resistor $R_9$. One end of a coil of the first reed relay $RL_1$ is connected to the control terminal $T_c$ while the other end is grounded. The drain of the field-effect transistor $Q_3$ is connected to the DC power source $+V_B$ while the source is connected to the output terminal $T_0$.

Next the mode of operation of the first embodiment with the above construction will be described. When the switch $SW_1$ is closed, a signal is applied not only to the set input terminal $S_1$ of the first flip-flop $FF_1$ but also to the reset input terminal $S_2$ of the second flip-flop $FF_2$, whereby both the first and second flip-flops $FF_1$ and $FF_2$ provide low level output signals. As a result the transistor $Q_1$ is enabled. This condition or mode may be maintained even after the switch $SW_1$ is opened. When the transistor $Q_1$ is enabled, a control signal is applied to the control terminal $T_c$ of the analog memory AM so that the coil of the first reed relay $RL_1$ is energized and consequently the first reed relay $RL_1$ is closed. In this case, the input terminal $T_i$ of the analog memory AM is at a low level so that the second capacitor $C_2$ which has been charged may be discharged and consequently the source-follower output of the second field-effect transistor $Q_3$ may be reduced accordingly. Then the source-follower output from the first field-effect transistor $Q_1$ is also decreased so that the charging rate of the first capacitor $C_1$ is decreased accordingly. The first capacitor $C_1$ is charged through the resistor $R_4$ and the third diode $D_3$. When the voltage across the first capacitor $C_1$ exceeds a reference voltage which is determined by the voltage dividing resistors $R_6$ and $R_7$, the conduction angle of the thyristor S is delayed so that the firing phase of the bidirectional thyristor Tr which is coupled through the pulse transformer PT may be decreased.

When the switch $SW_2$ is closed, the second flip-flop remains in the SET state but the first flip-flop $FF_1$ is reset, outputing a high level output signal because a signal is applied to the reset input terminal $RS_1$. The input terminal $T_i$ of the analog memory AM rises to a high level so that the second capacitor $C_2$ is charged and the source-follower output from the second field-effect transistor $Q_3$ increases. As a result, the source-follower output from the first field-effect transistor $Q_2$ also increases, resulting in the increase in the charging rate of the capacitor $C_1$. The conduction angle of the thyristor S is therefore advanced so that the firing phase of the thyristor Tr is increased.

When the switch $SW_3$ is closed, the second flip-flop $FF_2$ outputs a high level output signal so that the transistor $Q_1$ is disabled and consequently the coil of the first reed relay $RL_1$ is de-energized. Therefore the voltage across the second capacitor $C_2$ of the analog memory AM remains unchanged in magnitude so that a constant source-follower output is derived from the second field-effect transistor $Q_3$. As a result, a constant source-follower output is also derived from the first field-effect transistor $Q_2$ so that the charging rate of the first capacitor $C_1$ becomes constant and the conduction angle of the thyristor S also becomes constant. As a consequence the firing phase of the bidirectional thyristor Tr also becomes constant.

With the above "push-on" operations of the switches $SW_1$, $SW_2$ and $SW_3$, the power delivered to a load may be stepped up and down or may be stopped (held) or maintained constant.

The trapezoidal waveform power source $+V_C$ is required in order to always synchronize a triggering phase of the thyristor S with the phase of the AC power source.

Figure 3:
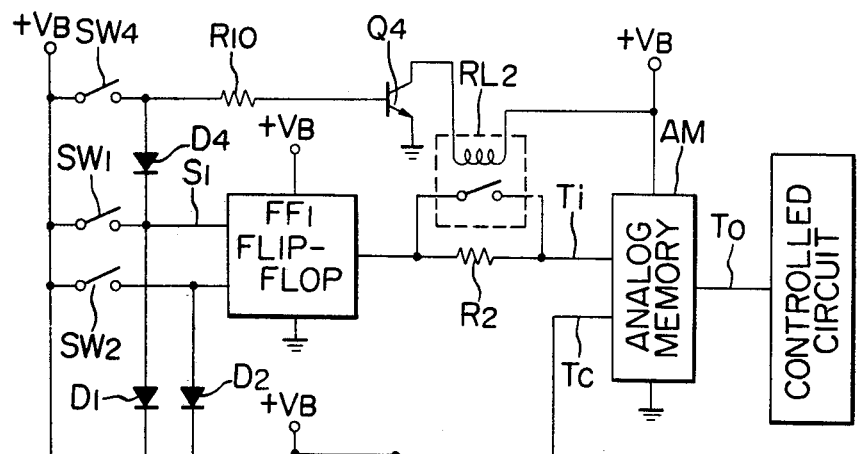
FIG. 3 is an electrical circuit diagram of a second embodiment of the present invention.

Second Embodiment, FIG. 3

Figure 4:
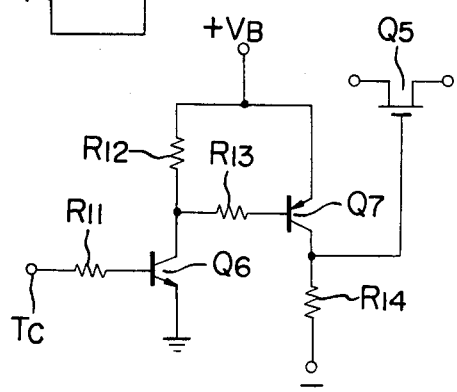
FIG. 4 is an electrical circuit diagram of a modification of an analog switch used in the present invention.

Next referring to FIGS. 3 and 4, the second embodiment of the present invention will be described. A movable contact of an emergency switch $SW_4$ is connected to a DC power source $+V_B$ while a fixed contact is connected through a resistor $R_{10}$ to the base of a transistor $Q_4$ and to the set input terminal $S_1$ of the first flip-flop $FF_1$ through a fourth diode $D_4$. The collector of the transistor $Q_4$ is connected to one end of a coil of a second reed relay $RL_2$ while the emitter is grounded. The other end of the coil of the second reed relay $RL_2$ is connected to a DC power source $+V_B$. The resistor $R_2$ is connected in parallel with the second reed relay $RL_2$. A controlled circuit in FIG. 3 is similar in construction to that shown in detail in FIG. 1.

When the switch $SW_4$ is closed, a signal is transmitted to the set input terminals $S_1$ and $S_2$ of the first and second flip-flops $FF_1$ and $FF_2$ so that the average voltage delivered to the load or the controlled circuit may be decreased in the manner described above. Simultaneously the signal is also impressed through the resistor $R_{10}$ to the base of the transistor $Q_4$ so that the latter is enabled and the coil of the second reed relay $RL_2$ is energized, thereby closing the second reed relay $RL_2$. In this case, the charging rate of the second capacitor $C_2$ of the analog memory AM is dependent upon a time constant $(R_2+R_8)C_2$. When $R_8<R_2$ the resistor $R_8$ is virtually short-circuited when the switch $SW_4$ is closed so that the voltage across the second capacitor $C_2$ is very quickly discharged; that is, the second capacitor $C_2$ is instantaneously discharged to zero. Then the output from the second field-effect transistor $Q_3$ becomes zero so that the first field-effect transistor $Q_2$ is disabled. As a result, the charging of the first capacitor $C_1$ is interrupted so that the conduction angle of the thyristor S becomes zero and consequently the average power delivered to the load becomes also zero.

When the cathode of the fourth diode $D_4$ is connected to the reset input terminal $RS_1$ instead of the set terminal $S_1$ of the first flip-flop $FF_1$, the average power delivered to the load may be instantaneously increased to a maximum when the switch $SW_4$ is closed. The second reed relay $RL_2$ may be connected in parallel with the resistor $R_8$ of the analog memory AM.

Instead of the first reed relay $RL_1$ of the analog memory AM, any suitable analog switch such as a semiconductor switch may be used. FIG. 4 shows a modification of the analog memory AM wherein a semiconductor switch or a third field-effect transistor $Q_5$ is used. Transistors $Q_6$ and $Q_7$ and resistors $R_{11}$-$R_{14}$ are so interconnected as to form a gate circuit to the third field-effect transistor $Q_5$. In like manner, the second reed relay $RL_2$ may be replaced with any suitable analog switch.

With the electronic power control device in accordance with the present invention, the power delivered to a load such as an incandescent lamp may be stepped up or down or maintained constant by the simple push-on operations of the switches. Furthermore the incandescent lamp may be instantaneously turned on or off. For instance, in case of a fire in a theater all of the illumination equipment may be instantaneously turned on so that the viewers may safely evacuate. In addition, the electronic power control device of the present invention may find widespread applications in various fields.

What is claimed is:

1. An electronic power control device, comprising:
   (a) a first R-S flip-flop with a set input terminal connected through an UP switch to a DC power source and a reset input terminal connected through a DOWN switch to said DC power source,
   (b) a second R-S flip-flop with a set input terminal connected through first and second diodes to said set and reset input terminals of said first R-S flip-flop and a reset input terminal connected through a STOP switch to said DC power source,
   (c) an analog memory comprising
      an input resistor with one end connected to an output terminal of said first R-S flip-flop,
      an analog switch one end of which is connected to the other end of said input resistor and which is enabled or disabled in response to the output from said second R-S flip-flop,
      a nonpolarized capacitor interconnected between the other end of said analog switch and the ground, and
      a MOS field-effect transistor with the gate connected to said other end of said analog switch, the drain connected to A DC power source and the source connected to an output terminal and connected to a source of reference potential through an output resistor,
   (d) a firing circuit coupled to said analog memory output terminal and connected in series with a control resistor and a firing capacitor, and means for interconnecting said firing circuit between a source of reference potential and a generally trapezoidal waveform power source in such a way that said firing circuit may be fired or rendered conductive in response to a predetermined level of voltage charged across said firing capacitor, and
   (e) a semiconductor device for controlling the level of voltage charged across said firing capacitor in response to the output from said analog memory.

2. An electronic power control device as set forth in claim 1 wherein a second analog switch is connected in parallel with a timing resistor, which determines a charging time of said analog memory, in such a way that said second analog switch may be closed at the instant when a second set input or a second reset input is applied to said second R-S flip-flop.

3. An electronic power control device as set forth in claim 1 or 2 wherein said first analog switch consists of a reed relay.

4. An electronic power control device as set forth in claim 1 or 2 wherein said analog switch consists of a semiconductor switch.

* * * * *